United States Patent [19]

Daus

[11] 4,015,437
[45] Apr. 5, 1977

[54] PROCESS FOR COOLING CRYOCABLES USING A HYDROGEN SLUSH

[75] Inventor: Wolfgang Daus, Frankfurt am Main-Hochs, Germany

[73] Assignee: Messer Griesheim GmbH, Frankfurt am Main, Germany

[22] Filed: May 13, 1975

[21] Appl. No.: 576,987

[30] Foreign Application Priority Data

May 15, 1974 Germany .......................... 2423609

[52] U.S. Cl. ........................................ 62/76; 62/12; 62/48; 62/514 R; 174/15 C
[51] Int. Cl.² ........................ F25C 1/00; H01B 9/06
[58] Field of Search ............. 62/45, 48, 55, 514 R, 62/62, 76, 10, 12; 137/13; 174/15 C, 15 S

[56] References Cited

UNITED STATES PATENTS

| | | | |
|---|---|---|---|
| 2,958,205 | 11/1960 | McConkey | 62/55 X |
| 3,109,296 | 11/1953 | Williamson et al. | 62/514 X |
| 3,643,002 | 2/1972 | Minnich | 174/15 S |
| 3,760,599 | 9/1973 | Bose | 62/55 X |
| 3,810,365 | 5/1974 | Hampton et al. | 62/48 |

*Primary Examiner*—Ronald C. Capossela
*Attorney, Agent, or Firm*—Connolly and Hutz

[57] ABSTRACT

A process for cooling cryocables by low-boiling gases includes recooling gases at cooling stations distributed along the length of the cable. The pressure loss of the gases is equalized at pumping stations equally distributed along the length of the cable. A slush of the low-boiling gas is produced and used as the coolant at each cooling station.

1 Claim, 2 Drawing Figures

PROCESS FOR COOLING CRYOCABLES USING A HYDROGEN SLUSH

BACKGROUND OF THE INVENTION

The invention relates to a process for the cooling of cryocables by means of low-boiling gases.

In the transmission of high electric power, the resistance losses in the transmission cable become so great that overheating of the cable is common. For many years attempts have been made to construct cables which are suitable for the transmission of high electric power. The construction of such high-power cables in all instances attempts to provide the cables with efficient cooling. Liquefied, low-boiling gases, among other things, are intended as the coolants for this purpose.

Cables cooled with such cryogenic liquids are hereafter called cryocables. Two types of cryocables are distinguished including the superconducting cables which relate to maximum-power cables and high-power cables which utilize the resistance reduction of normally-conducting metals with lowering temperatures.

In the case of superconducting cables wherein the superconducting cable core must be cooled below the particular transition temperature, the cryogenic liquid, e.g. helium, is absolutely necessary. With high-power cables having copper or aluminum as the conductor, advantages are brought forth by the use of lower temperatures on the basis of the strong temperature dependence of the specific electric resistance. Thus, for example, the specific electric resistance of pure copper in cooling from room temperature to 20° K is reduced by almost a factor of $10^{-4}$. Here the temperature dependence of the specific electric resistance between 20° and 30° K is particularly great.

The advantages offered by the cryocables with respect to the transmissible electric power are counteracted by the drawback of a relatively great expenditure necessitated by the special requirements of the low-temperature techniques. Thus, it is necessary to provide cooling stations at certain intervals along the entire length of the cable wherein the cryogenic coolant is recooled after being warmed. This warming is unavoidable with superconducting cables since even with the best insulation heat is absorbed from the surroundings. Furthermore, pumping stations must be distributed at certain intervals along the entire cable length in order to equalize the pressure loss experienced by the cryogenic coolant on passing through the cooling channel along the cryocable.

The coolant for the cooling of cryocables may be a low-boiling, liquefied gas in a boiling equilibrium. In this case the cooling liquid enters the conduit at an equilibrium temperature relating to the pressure. Any heat admission, be it from inside or outside, then leads to the formation of saturated steam so that with a growing distance from the inlet, the steam proportion continues to grow. Also, a recooling station must be provided before or at the point where the entire cooling liquid is evaporated to supply fresh liquid to the cable.

It is more advantageous if the pressure in the cryocable is raised to such an extent that the steam formation is fully eliminated. The liquid in this case is undercooled and the heat absorption leads to a rise in the liquid temperature. A recooling station must be then provided before or at the point where the temperature of the liquid has risen due to the heat supply to such an extent that the particular saturated steam pressure corresponds to the pressure in the cooling system. Such a system has the advantage of a reduced safety risk, since in a breakdown of the pumping or recooling station, the liquid may still evaporate and the cooling of the cable may still be continued for a period of time before damaged due to excessive heat.

A considerable part of the expenditures required for a cryocable involves the recooling stations. It is obvious that a cryocable becomes increasingly more expensive as the distance between recooling stations decreases.

SUMMARY OF THE INVENTION

An object of the invention is to increase the distance between recooling stations in cryocables operated with low-boiling gases as the coolant such distance being beyond the length achievable with prior cooling methods.

It has now been found that the above objective is achieved by employing a slush or slurry of the low-boiling gas as the coolant in the cooling stations.

Slush is a mixture of liquid and ice which is in equilibrium with the gas phase at the triple point. If, according to the present invention, slush is employed as the coolant for cryocables, the temperature of this coolant begins to rise upon entry into the cryocable only when the entire ice has melted. Thereafter, a phase of the heating of the liquid follows at which the boiling condition is finally reached.

In comparison to the prior cooling methods for cryocables, the present process offers considerably greater cooling capacity at otherwise equal conditions since the melting heat of the ice is utilized for cooling purposes. In comparison to a cable wherein only liquid is used for cooling, with a slush-cooled cable, the maximum temperature allowable is reached later so that the distance between the cooling stations may be greater. With a given total length of the cable, this produces a reduction of the number of cooling stations and consequently a considerable reduction of the investment costs. While it is true that the investment costs with respect to the present process are somewhat raised by the fact that at each cooling station an additional apparatus must be provided for the preparation of slush, these additional investment costs are considerably lower than the savings realized by the reduction of the number of recooling stations.

If one emanates from the fact that at a prior cooling station operated with liquid a safety zone of 2° K, for example, is maintained both for the triple point temperature as well as for the critical temperature, and that slush with an ice proportion of 50% by weight may technically be satisfactorily prepared and pumped, it is thus possible by using slush of reducing the number of cooling stations by about 12% with nitrogen and even by 30% with hydrogen.

As the method of preparation for slush, the process of the pulsating pumping out and the process of the nozzle expansion are suitable. In the process of the pulsating pumping out, the liquefied, low-boiling gas is situated in an insulated container. By means of a vacuum pump, gas is continuously pumped out from the gas chamber of the insulated container whereby the pressure is constantly maintained at the level required for making ice.

Since the liquid must raise the evaporation heat for the withdrawn gas, it is self-cooling. As soon as the triple point pressure is reached, ice begins to form. By the periodic changing of the suction capacity of the vacuum pump, the lowering of the ice may be initiated and the mixing of the ice with the liquid to form a slush may be effected.

In the process of the slush preparation by nozzle expansion, an already liquefied gas or a low-temperature gas under high pressure is expanded in a nozzle alternating between a pressure below the pressure of the triple point into the gas and ice zone and subsequently to a pressure above the pressure of the triple point into the gas and liquid zone.

For the novel process, the latter process of preparation is particularly suitable, since an especially fine-grained slush may be produced thereby. The percentage ice portion in the slush may be kept very high without adversely affecting the pumpability of the slush.

The novel process becomes particularly advantageous with respect to cables cooled with hydrogen, if the highest allowable cable temperature is below the critical temperature of the hydrogen. This may be the case, for example, with conventional cables of pure copper, wherein between 20.4° and 13.8° K the electric resistance drops by one-half, while the increased expenditure of the cooling capacity rises only to 50%. However, this is also the case with superconducting cables wherein the temperature of the coolant must always be so low that the superconducting elements do not lose their superconducting state even under the influence of magnetic fields.

By means of the process of the present invention, a reduction in the number of recooling stations by more than half is achieved.

BRIEF DESCRIPTION OF THE DRAWINGS

Novel features and advantages of the present invention in addition to those mentioned above will become apparent to one skilled in the art from a reading of the following detailed description in conjunction with the accompanying drawings wherein similar reference characters refer to similar parts and in which.

DETAILED DESCRIPTION OF THE INVENTION

Figure 1:
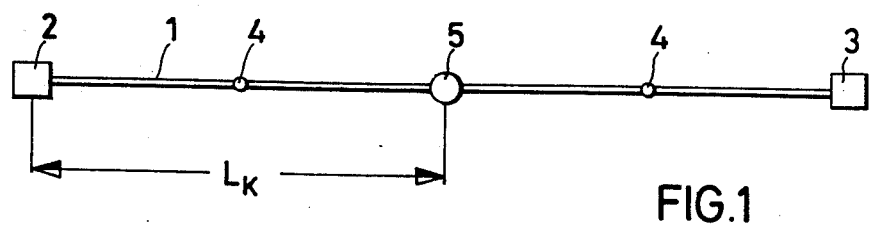
FIG. 1 illustrates a cryocable in schematic form.

FIG. 1 illustrates a cryocable 1 in schematic form. The cryocable begins at a generator 2 and ends at a consumer 3. Along the entire length of the cryocable 1, there are distributed at certain intervals pumping stations 4 and recooling stations 5. For the sake of simplicity, FIG. 1 shows only two pumping stations 4 and one recooling station 5. Essential for the amount of the investment costs is the allowable length $L_k$ between two recooling stations 5.

Figure 2:
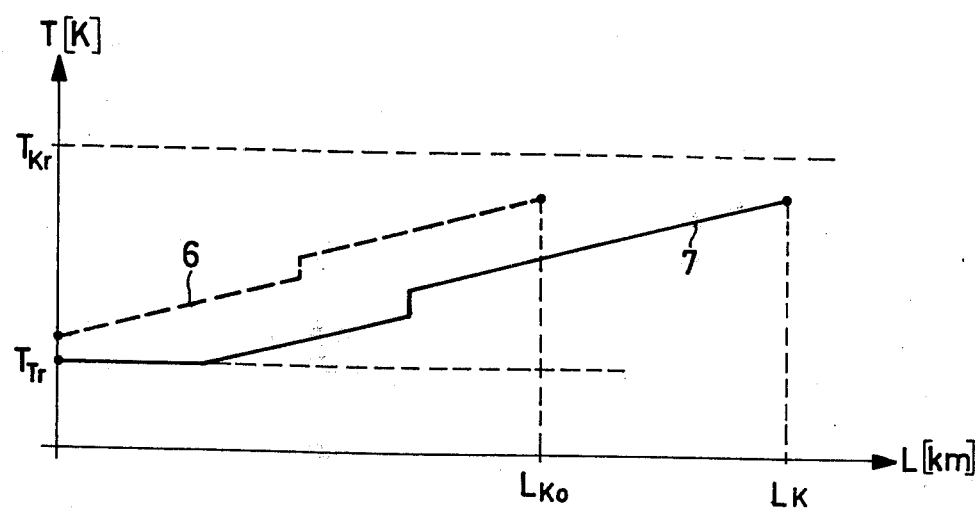
FIG. 2 is a graph illustrating the improvement of the temperature curve in cryocables achievable by the process of the present invention.

FIG. 2 illustrates in schematic form how the length $L_k$ is increased by the process of the present invention. In the diagram, the temperature curve [K] is plotted over the cable length L in [km]. Also plotted is the triple point temperature and the critical temperature of the low-boiling gas employed. The dotted line 6 gives the temperature curve in the cryocable using an undercooled liquid as the coolant. The lowest allowable temperature at the beginning must be above the triple point temperature, since otherwise the danger of an icing in the cooling station exists. The maximum length is $L_{Ko}$. The novel cooling process is reproduced by curve 7. The lowest temperature at the start is the triple point temperature, which initially does not change until the entire ice has melted.

Thereafter, the course is the same as in curve 6. The jump in curves 6 and 7 takes into account the heat supplied by the pumping station.

What is claimed is:

1. In a process for cooling cryocables by low-boiling gases, which are recooled at cooling stations distributed along the length of the cable and whose pressure loss is equalized at pumping stations equally distributed along the length of the cable, the improvement comprising producing a slush of the low-boiling gas and using the slush as the coolant at each cooling station by allowing liquid or gas under high pressure to expand in a nozzle alternately to a pressure below the pressure of the triple point thereby producing ice and subsequently to a pressure above the pressure of the triple point thereby producing liquid.

* * * * *